Feb. 24, 1953 — W. W. HOOLEY — 2,629,219
FRONT MOUNTED TRACTOR MOWER
Filed Aug. 3, 1948 — 4 Sheets-Sheet 2
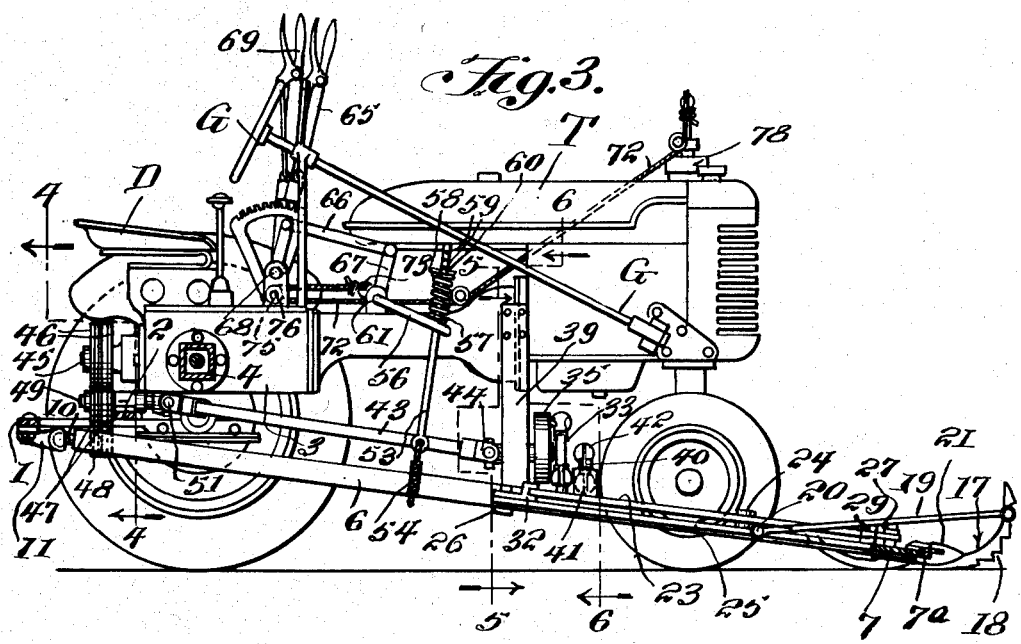
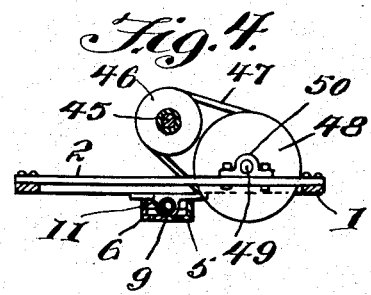
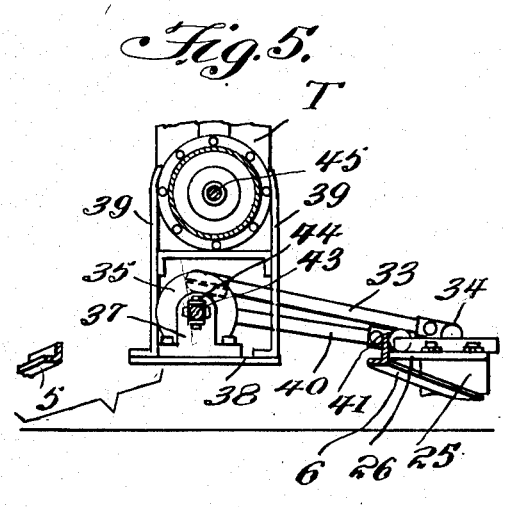
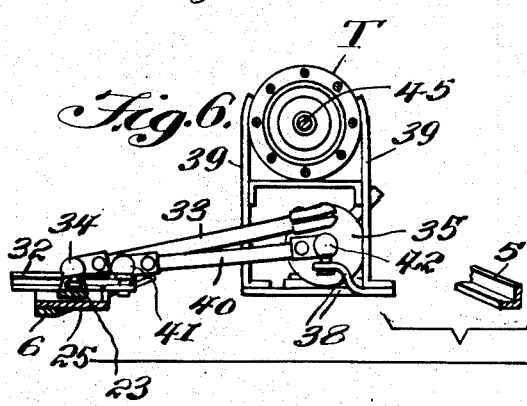
INVENTOR.
Wesley W. Hooley,
BY Victor J. Evans & Co.
ATTORNEYS

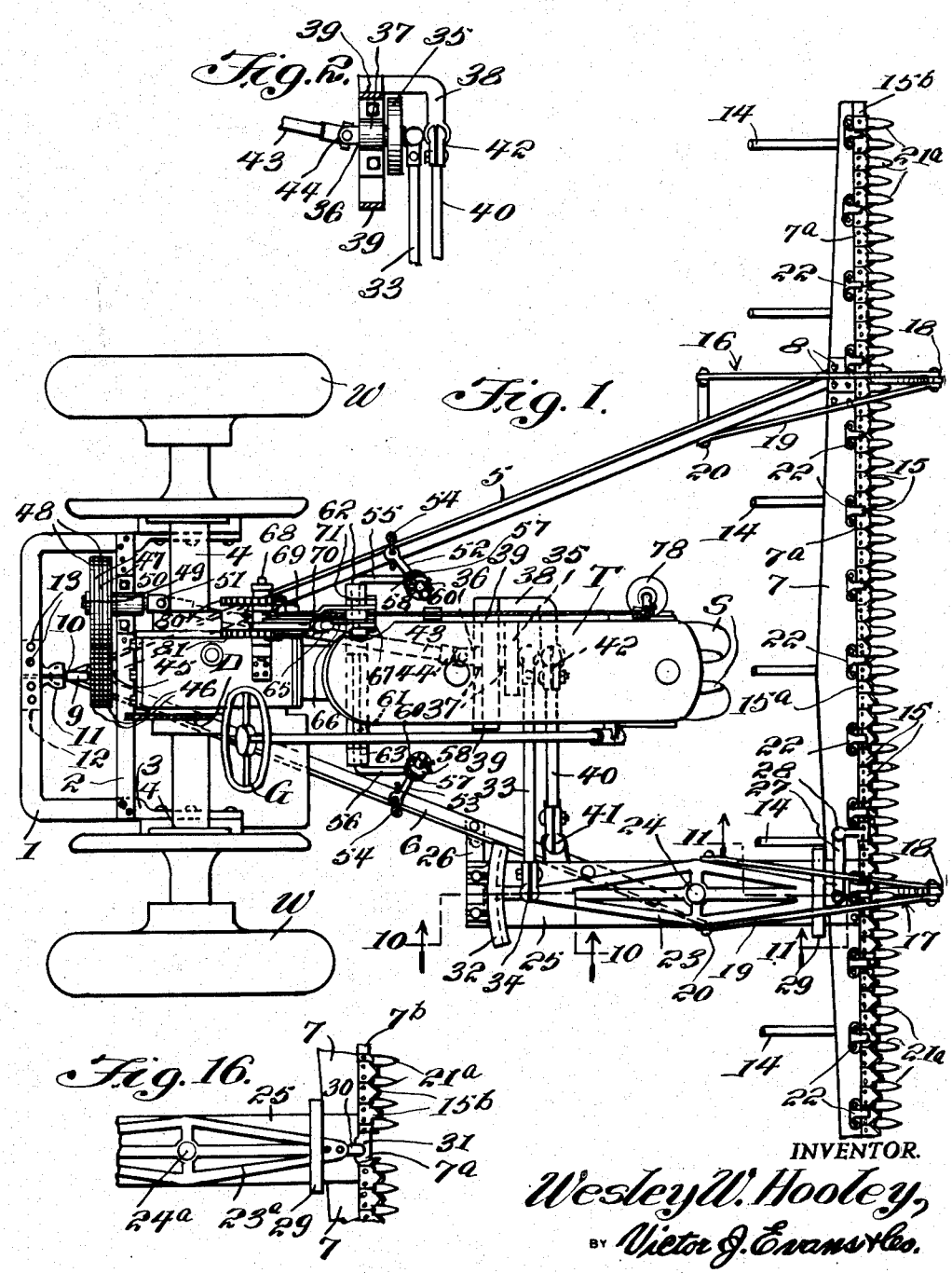

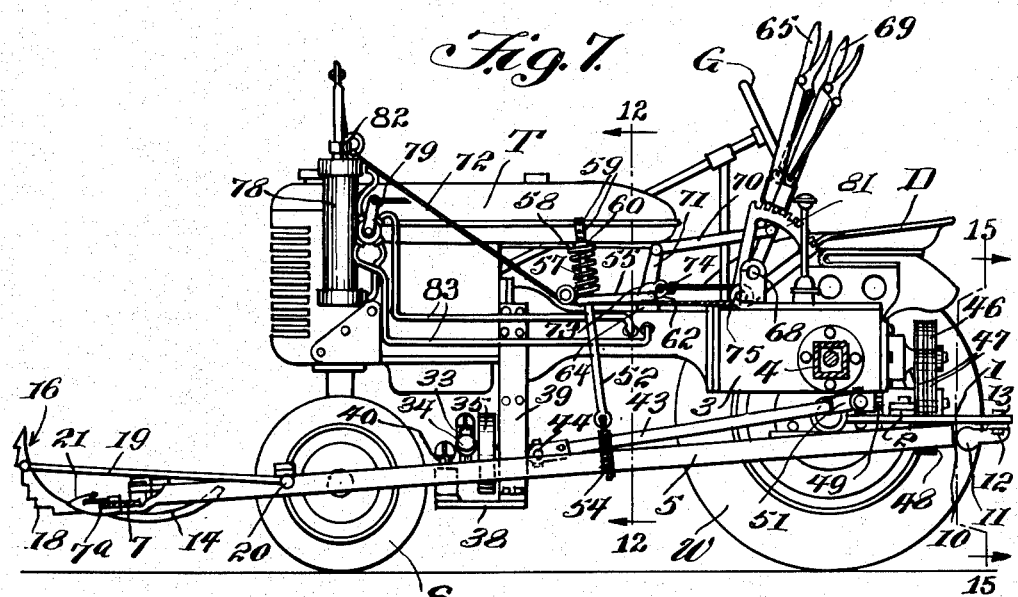
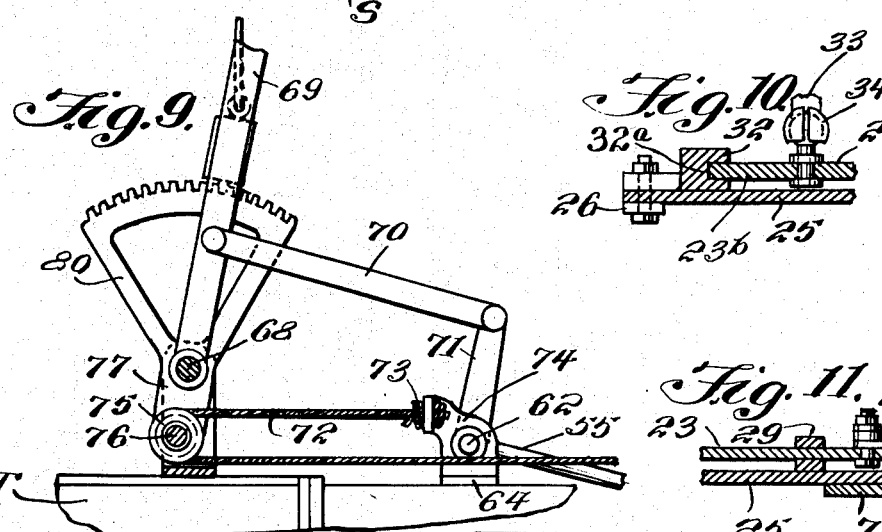
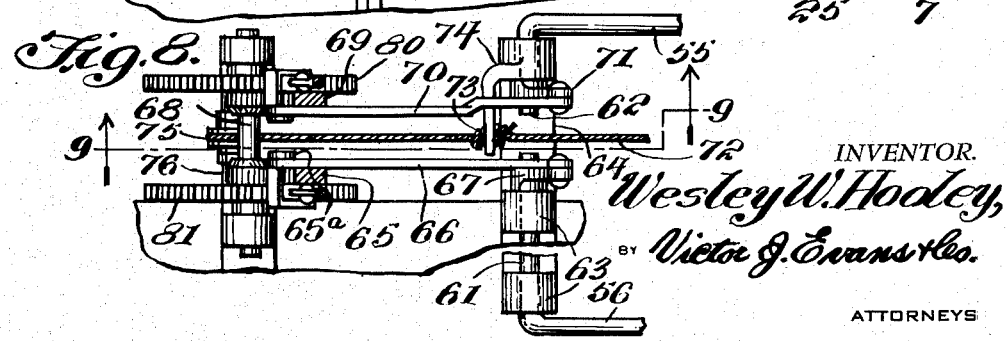

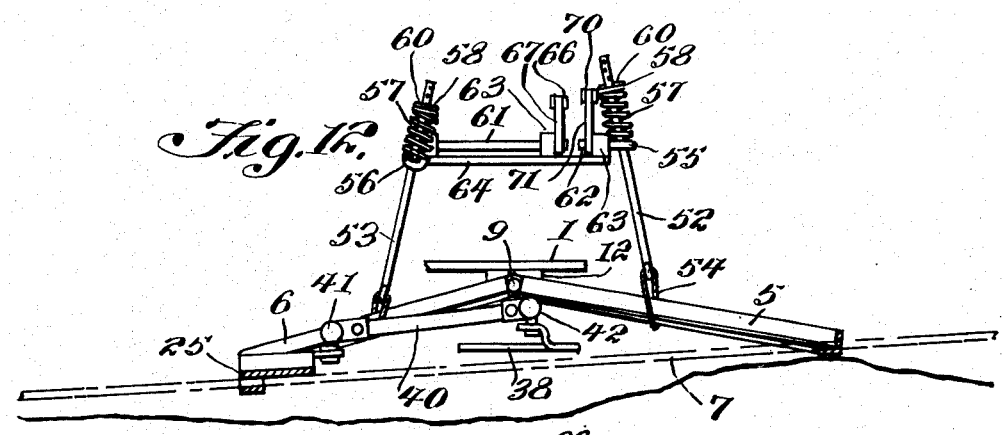

Patented Feb. 24, 1953

2,629,219

UNITED STATES PATENT OFFICE 2,629,219

FRONT MOUNTED TRACTOR MOWER

Wesley W. Hooley, Hammett, Idaho

Application August 3, 1948, Serial No. 42,210

2 Claims. (Cl. 56—25)

My present invention relates to the broad class of harvesters of the reciprocating sickle type propelled and operated automotive vehicles or tractors for cutting a standing crop of hay, and more specifically to an improved front mounted tractor mower that includes a flexible mowing implement that is resiliently mounted on and adjustably suspended from a tractor to accommodate and adapt the centrally arranged front cutting mechanism to irregularities in the surface of a field, thus insuring smooth operation of the cutters or reciprocating knives in cutting a swathe, and laying the cut hay in correct arrangement on the field for removal of the crop.

Power take-off mechanism is employed for transmitting rotary motion from the tractor shaft through a power shaft to the reciprocable cutting mechanism; manually controlled mechanism is employed for adjusting the resiliently supported and flexible mowing mechanism to irregularities in the ground surface; and power operated means are employed for elevating and otherwise vertically adjusting the implement with relation to the tractor.

The invention includes a minimum number of parts that may be manufactured with facility and at low cost of production, and the parts may be assembled with convenience to provide a durable implement that is simple in construction and operation and efficient in the performance of its required functions. The invention consists in certain novel features of construction and combinations and arrangements of parts as will hereinafter be described and more particularly pointed out in the appended claims.

In the accompanying drawings I have illustrated a complete example of a physical embodiment of my invention wherein the parts are combined and arranged in accord with one mode I have devised for the practical application of the principles of my invention.

Figure 1 is a top plan view of a front mounted tractor mower in which my invention is physically embodied.

Figure 2 is a detail plan view of the crank and pitman connection between the rotary power shaft and the reciprocating cutters or knives.

Figure 3 is a view in elevation at the right hand side of the tractor, with some parts in section, showing the reciprocating cutters in operative position.

Figure 4 is a detail vertical sectional view at line 4—4 of Fig. 3 disclosing the power take-off mechanism from the tractor.

Figure 5 is a vertical sectional view at line 5—5 of Figure 3; and Figure 6 is a similar view at line 6—6 of Fig. 3.

Figure 7 is a view in elevation at the left hand side of the tractor propelled implement with the cutting mechanism elevated.

Figure 8 is an enlarged detail plan view of the manual controls for adjusting or tilting the flexible and resiliently mounted implement and its cutting mechanism; and Figure 9 is a sectional elevation at line 9—9 of Fig. 8.

Figure 10 is an enlarged vertical sectional view toward the rear end of the rocker arm mechanism at line 10—10 of Fig. 1; and Figure 11 is a similar enlarged sectional view at line 11—11 of Fig. 1.

Figure 12 is an enlarged diagrammatic transverse sectional view taken on line 12—12 of Figure 7 with parts in section and parts omitted, showing the manner of tilting the resilient cutting mechanism to the left with relation to irregularities in the field; and Figure 13 is a view similar to Figure 12 but with the cutting mechanism tilted to the right of the tractor.

Figure 14 is a bottom plan view showing the universal ball and socket or swivel joint between the supporting frame of the tractor and the diverging radius bars or frame of the mowing implement; and Figure 15 is a vertical sectional view at the universal joint taken on line 15—15 of Figure 7.

Figure 16 is a fragmentary plan view showing the modified arrangement between the oscillating rocker arm and the reciprocating cutters or knives.

In order that the general arrangement and utility of parts may readily be understood I have shown a standard type of tractor T with traction wheels W, and the front steering wheels S that are controlled by the steering gear G readily accessible to the driver who occupies the seat D.

In the design shown, the tractor is equipped with a transversely disposed drawbar 1 with a cross bar 2 which are positioned at the rear of the tractor, and connected by arms 3 to the axle housing 4. The cutter elements are positioned across the front of the tractor and supported by radius rods 5 and 6 which extend from the drawbar to a cutter bar 7, thereby forming a triangular-shaped frame, with the cutter bar forming the base and spaced ahead of the forward end of the tractor.

The radius rods 5 and 6 are formed of angle irons, and the rod 5 is bolted to the cutter bar at the point 8, whereas the bar 6 supports the cutter bar through cutter operating mechanism. The rods 5 and 6 are joined at the rear as shown in Figure 14, with the ends 9 connected to a ball 10 in a split sphere 11, the sides of which are provided with flanges 12 which are connected to the drawbar 1 by bolts 13. The ball 10 and socket 11 provide a universal or swivel joint by which the cutter bar may be raised or lowered as desired. The frame of the cutter bar is also adapted to be adjusted laterally to tilt the cutting mechanism to the right or left to compensate for unevenness of the ground.

The under surface of the cutter bar is provided with a plurality of spaced arcuate shoes 14 which space the cutting knives 15 from the ground, providing ground runners protecting the cutting knives. The implement is provided with a pair of dividing rods 16 and 17 which are positioned equidistant from the center, and located above the cutter bar for guiding the grass toward each side as it is cut.

The forward edges 18 of the dividing rods are notched to provide teeth as shown in Figure 7, and the forward ends curve downwardly and rearwardly to prevent riding down the standing grass as the grass is separated or divided to the right and left as the cutter advances. The dividing rods are supported by forwardly extending rods 19, the rear ends 20 of which are connected to the respective radius rods 5 and 6. The rear ends of the dividing bars are mounted on the cutter bar 7, and these are positioned to prevent the grass from falling on a rocker arm and frame positioned behind the cutter bar.

The device may also be provided with a plurality of spaced shoes 21 with arcuate ends that may extend rearwardly from the cutter bar which may provide means for laying the cut grass in swaths or as desired on the field.

The cutter bar 7 has sufficient rigidity to support the sickle bar 7a with the knives thereon, and the rear edge slopes from a substantial thickness at the center to comparatively narrow outer ends.

The cutting knives 15 are mounted on the reciprocable sickle bar and the outer portions of the knives 15b at the ends are removed so that they will not protrude beyond the ends of the bar 7 while operating. The usual guards 21a extend forwardly from the forward edge of the bar 7 and the sickle bar is maintained in sliding engagement with the bar 7 by cleats 22 which are bolted to the bar 7 by the same bolts that hold the guards associated therewith. A center knife 15a is provided and is comparatively narrow, as compared with the adjacent knives 15. Fingers or guards 21 are equally spaced apart whereby the centers of the knives 15 arranged on one side of the center knife 15a register with the centers of the fingers 21, while at the same time the knives 15 on the other side of the center knife 15a are in between the fingers 21 so that the power required to actuate the cutter is reduced.

The sickle bar 7a is reciprocated through a diamond-shaped rocker arm 23 that is positioned longitudinally of the tractor and mounted to actuate in a horizontal plane, being pivotally mounted by a pin 24 on a plate 25. The plate 25 is suspended, at the rear from the radius rod 6 by a bracket 26, and the forward end is rigidly bolted to the cutter bar 7. The forward end of the rocker arm is connected by a link 27 through a ball and socket joint 28 to the sickle bar 7a, and the forward end of the rocker arm is positioned under a guide formed by a cross strap 29 mounted on the plate 25. As illustrated in Figure 16, which shows a modification of the rocker arm connection, the forward end of the rocker arm is provided with an extending knob 30 that coacts with a socket 31 in the sickle bar 7b, which actuates the cutters 15 with a reciprocating movement.

In this design, the rocker arm 23a is pivotally mounted on a pin 24a on the plate 25. The rear end of the rocker arm is provided with an extension 23b, as shown in Figure 10, that is slidably mounted in a slot 32a in a bar 32 on the plate 25, which provides guiding and holding means for this end of the rocker arm. This end of the rocker arm is connected by a pitman rod 33 through a universal joint 34 to an eccentric pin on a disk 35 that is mounted on a stub shaft 36, which is journaled in a bearing 37 on a frame 38 that is secured to brackets 39 which are bolted to the tractor. Between the rigidly mounted bearing frame 38, at the longitudinal center of the tractor, and the plate 25, is a horizontal brace 40 which is flexibly connected at the point 41 to the plate 25 and at the point 42 to the bearing 37 which assists in stabilizing the implement in its various adjusted positions.

The eccentric disk 35 is rotated by a power shaft 43 which is connected to the stub shaft 36 by a universal joint 44. The rear end of the shaft 43 is actuated by the power take-off shaft 45 of the tractor through a pulley 46 on the shaft 45, a belt 47, and a pulley 48 on a stub shaft 49, which is journaled on the cross bar 2 by a bearing 50, and connected to the shaft 43 by a universal joint 51.

The triangular frame of the pivotally mounted mowing implement is resiliently suspended and supported for adjustment from the opposite sides of the tractor T to insure flexibility of the cutting mechanism in travelling over uneven or rough ground in the field and to permit the cutting sections to automatically adapt themselves to these irregular conditions.

For this purpose a pair of upright suspending bars 52 and 53 are located one at each side of the tractor, and each is coupled at 54 to the radius bars or rods 5 and 6, and the upper ends of these suspending bars are suspended in a pair of crank arms 55 and 56 with a spring 57 coiled about each bar and interposed between each arm and a washer 58. The upper free end of each bar is perforated with a series of spaced holes 59 and a cotter pin 60 inserted in a selected hole retains the washer 58 in adjusted positions for holding the springs under tension and the bars in position. These lateral crank arms 55 and 56 are integral with and project forwardly from a pair of axially aligned rock shafts 61 and 62 respectively mounted transversely of the tractor in bearings 63 on a bearing plate 64 rigidly attached to the top portion of the tractor.

The triangular implement frame may be rocked in its swivel connection 11, and the two suspending spring bars 52 and 53 may selectively be manually raised or lowered by the driver in the seat B to adapt the flexible implement to the ground surface as indicated in Figs. 12 and 13. In combination with the manual controls power operated means are provided for elevating the implement to an inoperative position.

For this purpose, a manually operated ratchet lever 65 is connected by a pivot pin 65a by a link 66 to an arm 67 of the rock shaft 61, and the lever 65 is pivotally mounted on an axle 68 where it is readily accessible for the driver of the tractor, and a second ratchet lever 69 is pivoted on the axle 68 and connected by link 70 to an arm 71 of the rock shaft 62.

As a power operated mechanism for thus elevating and lowering the front portion of the triangular implement-frame on the central swivel bearing 11 at the rear of the tractor, a cable 72 is anchored at 73 to a fixed bracket 74, and the looped end of the cable passes around a sheave or roller 75 journaled on a shaft 76 that is carried by arms 77 of the stationary quadrants 80 and 81 that coact with the two levers 65 and 69. This looped cable is extended forwardly of the tractor, and its front end is attached to the connecting rod 82 of a hydraulic cylinder 78 positioned at the forward end of the tractor and connected to a fluid pressure system through tubes 83, with an operating valve 79 therein by which the cylinder may be manually controlled.

With the parts arranged in this manner, the operator on the seat D of the tractor may raise or lower the cutter bar and readily adjust the position thereof, and when it is desired to transport the implement from one place to another the complete operating instrumentalities may be elevated as shown in Figure 7.

It will be understood that other modifications may be made in the design and arrangement of the parts without departing from the spirit of the invention.

Having thus fully described my invention, what I claim as new and desire to secure by Letters Patent is:

1. A mower attachment for a tractor comprising a horizontally disposed drawbar arranged transversely at the rear of the tractor and secured thereto, a pair of diverging radius rods having their rear ends defining an apex, a ground engaging member extending forwardly from the front portion of one of said radius rods and arranged parallel to the longitudinal axis of the tractor, a ball and socket joint connecting said apex with said drawbar, a cutter bar arranged forwardly of said tractor and extending transversely between the other of said radius rods and said ground engaging member, a plurality of spaced parallel arcuate shoes arranged along the lower surface of said cutter bar, a vertically disposed bar extending upwardly from each of said radius rods, said bars being provided with a plurality of spaced openings in their upper portions for receiving a securing element, a pair of crank arms mounted on said tractor and having sliding engagement adjacent their ends with said bars, a coil spring circumposed on the upper portion of each of said bars and bearing against said securing element and against said crank arms, and manually operable means connected to said crank arms for adjusting the same and said cutter bar.

2. The apparatus as described in claim 1, wherein said cutter bar is provided with at least two groups of first contiguous cutting knives of uniform width having contiguous relation to a second cutting knife of substantially half the width of said first cutting knives, said cutter bar also being provided with a group of uniformly spaced cutter guards, whereby the knives of each group of cutting knives will have a different relationship to their corresponding guards.

WESLEY W. HOOLEY.

REFERENCES CITED

The following references are of record in the file of this patent:

UNITED STATES PATENTS

| Number | Name | Date |
|---|---|---|
| 38,123 | Piggott et al. | Apr. 7, 1863 |
| 515,603 | Moon | Feb. 27, 1894 |
| 1,305,088 | Gillespie | May 27, 1919 |
| 1,587,862 | Rutishauser et al. | June 8, 1926 |
| 1,598,843 | Bauercamper | Sept. 7, 1926 |
| 1,610,498 | Duckett | Dec. 14, 1926 |
| 2,138,711 | Rohwer | Nov. 29, 1938 |
| 2,263,886 | Munro | Nov. 25, 1941 |

FOREIGN PATENTS

| Number | Country | Date |
|---|---|---|
| 47,428 | France | Jan. 28, 1937 |